Dec. 2, 1952 R. H. BAKER ET AL 2,620,440

ELECTRONIC COUNTING DEVICE

Filed Oct. 29, 1949 2 SHEETS—SHEET 1

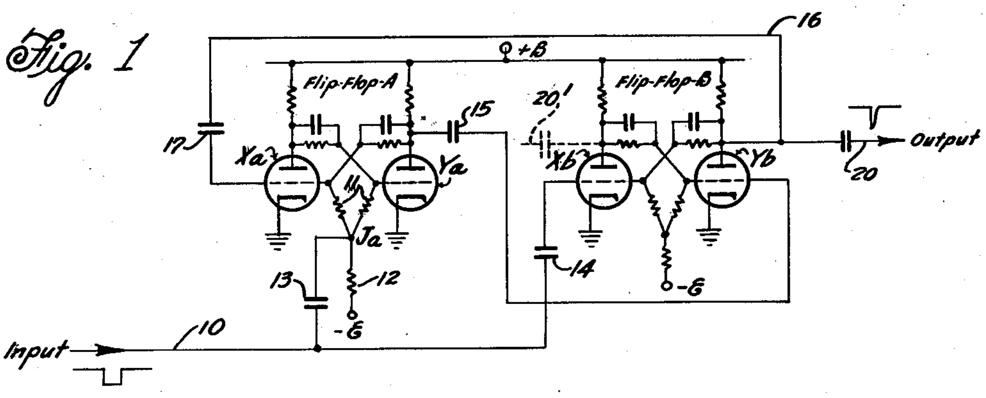

Fig. 1

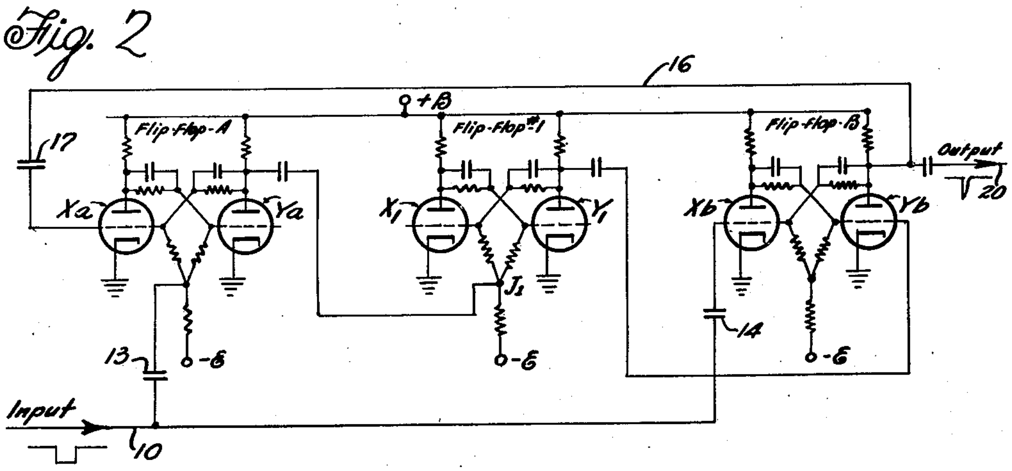

Fig. 2

Fig. 3

| | INPUT PULSE | A FLIP-FLOP tube Xa | A FLIP-FLOP tube Ya | | #1 FLIP-FLOP tube $X_1$ | #1 FLIP-FLOP tube $Y_1$ | | B FLIP-FLOP tube Xb | B FLIP-FLOP tube Yb | OUTPUT PULSE |
|---|---|---|---|---|---|---|---|---|---|---|
| | 0 | OFF | ON | | OFF | ON | | OFF | ON | |
| | 1 | ON | OFF | | OFF | ON | | OFF | ON | |
| | 2 | OFF | ON | CARRY | ON | OFF | | OFF | ON | |
| CYCLE | 3 | ON | OFF | | ON | OFF | | OFF | ON | |
| | 4 | OFF | ON | CARRY | OFF | ON | CARRY | ON | OFF | |
| | 5 | OFF | ON | | OFF | ON | | OFF | ON | CARRY |
| | 6 | ON | OFF | | OFF | ON | | OFF | ON | |
| | 7 | OFF | ON | CARRY | ON | OFF | | OFF | ON | |

INVENTORS:
RICHARD H. BAKER
DONALD E. ECKDAHL

BY Herbert E. Metcalf
ATTORNEY

ELECTRONIC COUNTING DEVICE

Filed Oct. 29, 1949 2 SHEETS—SHEET 2

INVENTORS:
RICHARD H. BAKER
DONALD E. ECKDAHL

BY Herbert E. Metcalf
ATTORNEY

Patented Dec. 2, 1952 2,620,440

UNITED STATES PATENT OFFICE 2,620,440

ELECTRONIC COUNTING DEVICE

Richard H. Baker, Los Angeles, and Donald E. Eckdahl, Manhattan Beach, Calif., assignors to Northrop Aircraft, Inc., Hawthorne, Calif., a corporation of California Application October 29, 1949, Serial No. 124,334

7 Claims. (Cl. 250—27)

This invention relates to electronic counting circuits and more particularly to the type that reset at an odd number.

When using electronic counting circuits for rate division of a pulse stream, or for providing the stages of a multi-stage counter, for example, it is desirable that they be so arranged that they emit a pulse to an outgoing circuit and automatically reset to a zero designated condition after a given number of pulses have been received on an incoming circuit.

It is well known that counting circuits of this type can be provided based on the use of a fundamental circuit known as a modified Eccles-Jordan flip-flop. These latter circuits are of a binary nature however; and thus, although they are admirably suitable for counting circuits in the binary geometric progression system, their inherent binary operation make them unwieldy to adapt to counting methods in odd number radix systems.

It is therefore an object of this invention to provide a means for simply adapting flip-flop circuits to count in odd number radices.

Further, it is highly desirable to be able to adapt a normal cascade of flip-flop circuits for counting even numbers radices other than those included in the binary geometric progression system; in particular, the radix ten.

It is therefore another object of this invention to provide a novel means for modifying the interconnection of a normal cascade of flip-flop circuits to count in the decimal system.

In accordance with this invention, the modified Eccles-Jordan flip-flop circuit referred to is of the type having a common input to both of its tubes whereby it can be triggered from whichever state it is in to the other by a single pulse applied thereto. Another characteristic of this flip-flop circuit is that it can also be changed in state by a proper polarity pulse applied directly to one of the grids of the tubes. Thus each flip-flop circuit has three possible inputs: the common input, and the input to each of the grids. In general, a pulse applied at the inputs to the grids is considered to be more effective and less critical in action than a similar pulse applied at the common input.

Briefly, the present invention comprises a plurality of flip-flops, of the type as above described, arranged in cascade to form a counter. An incoming circuit to the counter is connected directly to the common triggering point of the first flip-flop; and each of the successive intermediate flip-flops, if any, have their common triggering point connected to the carry plate of the preceding flip-flop circuit. Connecting means are then provided for the last flip-flop so that whenever it receives a carry pulse, the next pulse on the incoming circuit is enabled to change only the state of the last flip-flop and thus return all the flip-flops in the counter to a zero designated condition. The outgoing circuit from the counting circuit is connected to this last flip-flop and carries one of the outgoing pulses created by its change in state.

This invention will be made more apparent from the ensuing description of the drawings in which:

Figure 1 is a circuit diagram of the electronic counter of the present invention which resets at the number three.

Figure 2 is a circuit diagram showing how an intermediate flip-flop can be added to the circuit in Figure 1 to enable resetting at the number five.

Figure 3 is a table of the conditions of the tubes, of the flip-flops in the counter of Figure 2, as they count through a cycle.

Figures 4, 5, 6:
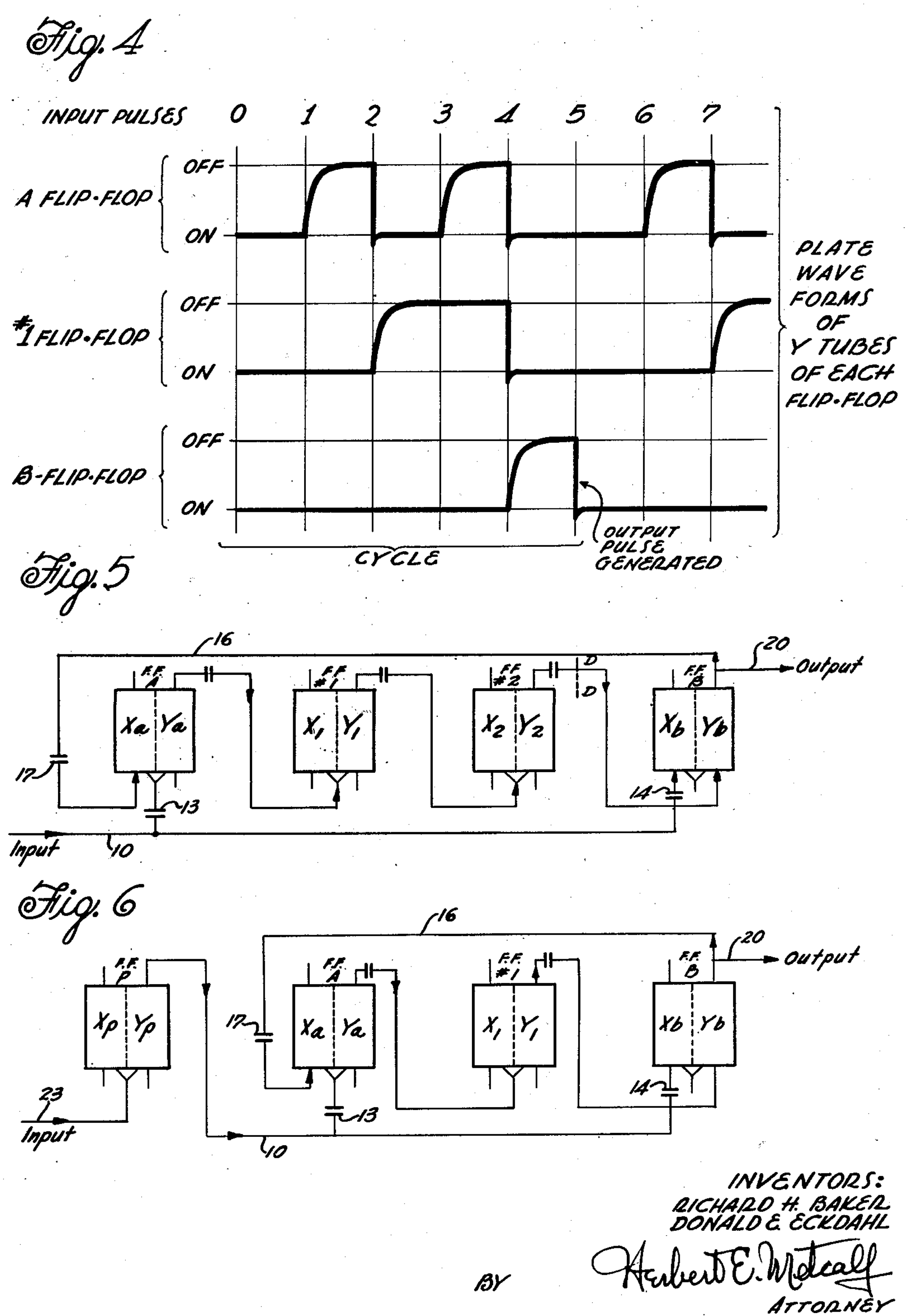
Figure 4 is a graph sequence of voltage conditions for the carry tubes of the flip-flops in Figure 2.
Figure 5 is a block diagram illustrating how additional intermediate stages can be added for obtaining other odd number counters.
Figure 6 is a block diagram illustrating how the present invention can be adapted for counting in the decimal system.

Referring first to Figure 1, flip-flop networks A and B are there shown interconnected so as to form a ternary counting circuit, i. e., a circuit which resets, or cycles, to a zero designated condition of its tubes when three input pulses are received on an input line 10.

The two tubes in each flip-flop have their plates and grids intercoupled, as is well known, so that when a common potential is applied across them they will settle at a stable state such that one tube is conducting and the other tube is non-conducting. The flip-flop will then remain in its existing state until switched by a properly applied pulse.

For example, flip-flop A can be triggered by applying a negative polarity pulse at a junction $J_a$ which is connected to the grids of each of the tubes through individual resistors 11. Junction $J_a$ is further connected to a negative potential $-E$ through a bias resistor 12. This arrangement of input resistors with a flip-flop is well known as a Potter network. Flip-flop A, for example, can also be triggered or caused to change its state by applying input pulses directly to the grids of one of its tubes. For instance, in the present invention, by applying a negative pulse directly to the grid of a conducting tube, the opposite tube can be made to conduct.

As noted, the left and right tube of each of the flip-flops is assigned the letters X and Y, respectively, with appropriate subscripts. As the right tubes in each flip-flop have the outgoing leads connected thereto, tubes $Y_a$ and $Y_b$ are known as carry tubes, and tubes $X_a$ and $X_b$ are known as non-carry tubes.

For the particular arrangement of the flip-flops in Figure 1, incoming circuit 10 is connected through a first input capacitor 13 to the junction $J_a$ of flip-flop A. Incoming circuit 10 is also connected through a second input capacitor 14 to the grid of tube $X_b$ of flip-flop B.

The output from the carry plate of tube $Y_a$ is then connected through an interconnecting capacitor 15 to the grid of the other tube, $Y_b$, of flip-flop B.

To complete the present hookup a feedback line 16 is connected from the plate of tube $Y_b$ to the grid of tube $X_a$ through a feedback capacitor 17. The outgoing circuit 20 from the counter is likewise preferably taken from the plate of tube $Y_b$, although it should be noted that this outgoing circuit connection could also be made at the tube $X_b$, as shown by line 20′, and still give the proper rate division of pulses on the incoming circuit 10.

In order to explain the operation of the ternary counter, assume that the $Y_a$ and $Y_b$ tubes are conducting and that negative polarity square pulses are being applied on the incoming circuit 10. The first of these input pulses, applied at the junction $J_a$ of flip-flop A, turns tube $X_a$ on and turns tube $Y_a$ off. This first input pulse has no effect on flip-flop B, however, since it is applied to the grid of tube $X_b$ which is already off.

The result of the change in state of flip-flop A causes a rise in potential at the plate of tube $Y_a$. However, as will be more clearly shown in the ensuing description, this rise in potential is gradual due to transients in the network so that it is effectively attenuated through the differentiating circuit comprised of interconnecting capacitor 15 and the resistance of the grid of tube $Y_b$.

The second negative polarity input pulse, applied on incoming circuit 10, again reverses the state of the flip-flop A, causing tube $Y_a$ to again conduct. The drop in potential thus created on the plate of tube $Y_a$ is of a sudden nature as contrasted with the previous gradual potential rise so that it is communicated through interconnecting capacitor 15 as a peaked negative carry pulse onto the grid of tube $Y_b$.

It is noted that as a result of this second input pulse, two distinct actions are imposed on flip-flop B. First, the second input pulse is impressed directly as a negative pulse on the grid of non-carry tube $X_b$; secondly, the negative carry pulse, which was emitted from flip-flop A as a result of the second input pulse on it, is impressed on the grid of carry tube $Y_b$. These negative pulses obviously act in opposition on flip-flop B. However, the negative carry pulse impressed on the grid of tube $Y_b$ predominates over the second input pulse applied to the grid of tube $X_b$ for two reasons.

In the first place, the input pulse applied on the incoming circuit 10 is comparable in magnitude and width with the carry pulses from tube $Y_a$; but, whereas the carry pulses are applied directly, the incoming pulses are divided so as to be applied to both flip-flops. Thus the carry pulses are always stronger signals. In the second place, the carry pulse is delayed with respect to the input pulse by the time required for flip-flop A to produce it, so that the carry pulse exists after the incoming pulse has disappeared.

Thus, the second pulse effectively changes the state of both flip-flop A and flip-flop B. It should be noted that the slow rise in potential on the plate of tube $Y_b$, as flip-flop B is changed by the second input pulse, is not communicated over the feedback line 16 to the grid of tube $X_a$; since, as explained before, positive going changes in potential are attenuated by the feedback differentiating circuit comprised, in this case, of capacitor 17 and the chosen resistance of the grid of tube $X_a$.

The third input pulse on incoming circuit 10 attempts to change the state of flip-flop A as was accomplished by the previous two input pulses. However, before this triggering action can be realized, this same third input pulse, which is also applied on the conducting tube $X_b$, causes flip-flop B to change state. The resulting sudden drop in potential on the plate of tube $Y_b$ is immediately communicated as a differentiated peaked negative pulse on feedback line 16 to the non-conducting tube $X_a$ of the flip-flop A; and prevents the third input pulse which has been applied on the less sensitive input junction $J_a$ from changing the state of flip-flop A.

This same carry pulse, which is fed on feedback line 16 for blocking the triggering effect of the third input pulse on flip-flop A, is fed as an output pulse on outgoing circuit 20.

Thus one output pulse has been fed out on outgoing circuit 20 for three input pulses on the incoming circuit 10. Moreover, the flip-flops have now cycled back, or reset, to the condition with tube $Y_a$ and $Y_b$ "on" and tubes $X_a$ and $X_b$ "off," as originally assumed, so that the fourth input pulse finds the flip-flops in the same condition as the first input pulse.

Referring next to Figure 2, a circuit diagram is shown with an intermediate flip-flop #1 comprised of tubes $X_1$ and $Y_1$ inserted between flip-flops A and B. It is seen here that the interconnection of flip-flops A and B have not been changed except for the fact that the output from tube $Y_a$ is connected to the junction $J_1$ of the intermediate flip-flop #1, while the output from the plate of tube $Y_1$ is connected to the grid of tube $Y_b$. The counting circuit of Figure 2 will be seen to be a quinary counter, i. e., one which resets at the odd number 5.

Referring to Figure 3, a table is shown describing the conditions of the tubes in the flip-flops of Figure 2 as the input pulses are successively impressed on the incoming circuit 10.

As before described, and as seen in the table of Figure 3, the Y tubes of all the flip-flops are initially "on" for the zero or reset condition of the counter. As the first four input pulses are successively applied to the counter, it can be seen that flip-flop A and flip-flop #1 trigger off and on as in ordinary binary counting, i. e., for every two pulses received on the input to a flip-flop a single carry pulse is emitted to the output. It should be noted that these first four negative input pulses, although felt on the grid of tube $X_b$ in flip-flop B, have no effect thereon since the tube is in a non-conducting state.

Referring to the circuit of Figure 2 and the graph of Figure 3, it is seen that after the fourth input pulse has been applied to the counting circuit, a carry pulse is conveyed from the #1 flip-flop to change the state of the B flip-flop. The flip-flops are now in the condition to permit the fifth input pulse to change the state of flip-flop B and thus cause a carry pulse on feedback line 16, to serve its function of blocking the effect of the fifth input pulse in its attempt to trigger flip-flop A.

This carry pulse from the tube of $Y_b$ of flip-flop B is also conveyed as the output pulse on outgoing circuit 20.

Referring to the table in Figure 3 it can be seen that the sixth input pulse finds the flip-flop circuits in the same condition as did the first input pulse, i. e., the conditions of the tubes of the flip-flops have cycled back to their original orientation.

Figure 4 is a graph revealing the plate waves forms of the Y tubes, or carry tubes, of each of the flip-flops as the counter changes its state in going through a cycle. It is seen here that the triggering of a Y tube from an on to off condition results in a comparatively gradual rise of the potential on its plate as compared to the sudden drop in potential evidenced on the Y plate when its tube is triggered to become conducting. Thus, as previously explained, the differentiation action of the capacitor and grid, through which the changes in Y plate potentials are conveyed, is practically non-existent for increased potentials on the Y plates, while this action on the decreased potentials results in them being conveyed as peaked negative pulses which cause definite triggering action on the tubes.

Moreover, in Figure 4, the blocking action on flip-flop A, as a result of the fifth input pulse, is clearly revealed in the graph by the absence of change of voltage on the $Y_a$ plate at this instance. It is made apparent here, however, that the drop in potential experienced by the $Y_b$ plate at the instant of the fifth input pulse results in an output carry pulse from flip-flop B.

Referring to Figure 5, a simplified block diagram of a counting circuit is shown with two intermediate flip-flops #1 and #2 placed between the A and B flip-flops. The block diagram of each flip-flop illustrates in particular the right and left tubes X and Y, respectively; the common input J; the inputs to each of the grids of the tubes; and the two outputs from the plates of the tubes. The arrangement of the external connections, which constitute the present invention, are clearly indicated. For the particular circuit embodiment utilizing two intermediate flip-flops, the counting circuit can be shown to reset at the odd number 17.

It is now readily apparent that any number of additional intermediate flip-flops can be similarly added into the circuit at the point intersected by line D—D in Figure 5. In general, it can be shown that the addition of $n$ flip-flops to the circuit of Figure 1 will result in a counting device that will reset after $(2^{n-1}+1)$ input pulses are applied.

Referring next to Figure 6, a block diagram of the counting circuit in Figure 2, which resets after five input pulses are applied, is shown preceded by an ordinary flip-flop functioning as a binary stage. This embodiment forms a decade counter. The flip-flop P divides the incoming pulse rate on input line 23 by two, and the five-resetting counter divides the output rate from flip-flop P by five. The result is division by ten. Thus a decade resetting counter has been supplied which enables counting to be obtained in the decimal system. By using a plurality of such units for successive stages of a multi-stage counter, ordinary decimal counting to any number can be obtained.

Thus, it has clearly been revealed how a counting device for resetting at odd numbers can be obtained from a normal binary chain of flip-flops with a minimum requirement of modifications in their external interconnections.

The primary advantage of this arrangement for connecting flip-flops to obtain odd number radices is that the action of the carry and reset signals is precise and does not require critical examination or adjustment of circuit elements to produce reliable results. At no time during the cycle of operation is there any question as to the action of the circuits in the device. Even when two signals tend to oppose one another there is no balancing effect since one of them retains absolute control and completely blocks the other one out of the action.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An electronic counting circuit comprising a plurality of flip-flops arranged in a cascade; an incoming line connected to the first and last flip-flops of said cascade; carry connections to successive flip-flops in said cascade; connecting means between the last flip-flop and the first such that pulses on said incoming line can trigger said first flip-flop only, until said last flip-flop has received its first carry pulse, after which further changes in the preceding flip-flop circuits are prevented and that pulse on said incoming line which immediately follows, in time, the sending of said first carry pulse to said last flip-flop is enabled to change the state only of the last flip-flop, an outgoing line from said counting circuit connected to said last flip-flop.

2. In a counting circuit, a plurality of pulse operated flip-flop networks arranged in series; said flip-flop networks having a carry pulse output from one to the next; an incoming line connected to the first and last flip-flops of said series carrying incoming pulses being applied to the first and last flip-flops of said series; said incoming pulses triggering said first flip-flop only, until a carry pulse is sent to said last flip-flop; that pulse on said incoming line which immediately follows, in time, the sending of said carry pulse to said last flip-flop triggering said last flip-flop; said last flip-flop having a carry pulse output to said first flip-flop whereby that carry pulse which is the result of said last flip-flop being triggered by a pulse from said incoming line prevents said latter incoming pulse from triggering said first flip-flop.

3. In a counting circuit, a plurality of pulse operated flip-flop networks arranged in series, said flip-flop networks having a carry pulse connection from one to the next, said flip-flop networks being initially energized with those tubes which have an output line connected to the grids of the immediately following flip-flops of said series conducting, an incoming line connected to the first and last flip-flops of said series carrying incoming pulses being applied to the first and last flip-flop networks of said series, circuit means whereby said incoming pulses are capable of triggering said first flip-flop only until a carry pulse is emitted to said last flip-flop at which time that pulse on said incoming line which immediately follows, in time, the sending of said first carry pulse to said last flip-flop is capable of triggering said last flip-flop only, whereby all said flip-flops are returned to their initial state.

4. In a counting circuit, a plurality of pulse operated flip-flop networks arranged in cascade, said flip-flop networks having a carry pulse connection from one to the next, said flip-flop networks being initially operated with those tubes which have an output line connected to the grids of the immediately following flip-flops of said cascade of flip-flops conducting, an incoming line for the transmission of pulses to the first and last flip-flops of said cascade, said incoming pulses being applied to the first and last flip-flop networks of said series, said incoming pulses triggering said first flip-flop only until a carry pulse is emitted to said last flip-flop, said last flip-flop being triggered by that incoming pulse which immediately follows, in time, the sending of said first carry pulse to said last flip-flop, a feedback connection from said last flip-flop to said first whereby, when said last flip-flop is triggered by said incoming pulse, a carry pulse is fed on said feedback connection to prevent said latter incoming pulse from triggering said first flip-flop.

5. In a counting circuit, a plurality of pulse operated flip-flops arranged in a cascade; each of said flip-flops comprising a pair of tubes; said flip-flops capable of operation by a pulse applied at a common input point, or an input point at one of the grids, of its tubes; an input point circuit connected to the common input point of the first flip-flop and the grid of the carry tube of the last flip-flop; carry circuits from the carry plate of each of the flip-flops to the common input point of the succeeding flip-flop except the last; a carry circuit from the carry plate of the next to the last flip-flop to the grid of the carry tube in the last flip-flop; a feedback circuit from the carry plate of the last flip-flop to the grid of the non-carry tube of the first flip-flop; an output circuit from the carry plate of the last flip-flop; whereby an input pulse rate fed into said input circuit is divided by $(2^{n-1}+1)$ in said output circuit where $n$ is equivalent to the number of flip-flops in said counting circuit.

6. Apparatus in accordance with claim 5 wherein differentiating circuits comprised of capacitors and chosen resistances of the grids are used in the carry circuit between the next to the last and the last flip-flop, and in the feedback circuit from the last to the first flip-flop, said differentiating circuit effectively passing only the sharp negative going changes of the plate voltages.

7. A stage of a ternary counter comprising a first and second flip-flop circuit of the type capable of operation by a pulse applied at a common input point to its tubes or by pulses applied at the grids of its tubes, an incoming circuit connected to the common input point of said first flip-flop and to the grid of the non-carry tube of said second flip-flop, a carry pulse circuit from the plate of the carry tube of said first flip-flop to the grid of the carry tube of said second flip-flop, a feedback circuit from the plate of the carry tube of said second flip-flop to the grid of the non-carry tube of said first flip-flop, an outgoing circuit from the carry plate of said second flip-flop whereby one output pulse is emitted on said outgoing circuit for every three input pulses on said incoming circuit.

RICHARD H. BAKER.
DONALD E. ECKDAHL.

REFERENCES CITED

The following references are of record in the file of this patent:

UNITED STATES PATENTS

| Number | Name | Date |
|---|---|---|
| 2,409,229 | Smith et al. | Oct. 15, 1946 |
| 2,470,716 | Overbeck | May 17, 1949 |

OTHER REFERENCES

Electronic Counters, from RCA Review, vol. 7, No. 3, September 1946, pages 438 to 447.